(12) United States Patent
Oprea et al.

(10) Patent No.: US 9,338,187 B1
(45) Date of Patent: May 10, 2016

(54) MODELING USER WORKING TIME USING AUTHENTICATION EVENTS WITHIN AN ENTERPRISE NETWORK

(71) Applicant: EMC Corporation, Hopkinton, MA (US)

(72) Inventors: Alina Oprea, Arlington, MA (US); Ting-Fang Yen, Cambridge, MA (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/139,019

(22) Filed: Dec. 23, 2013

Related U.S. Application Data

(60) Provisional application No. 61/903,015, filed on Nov. 12, 2013.

(51) Int. Cl.
*H04L 29/06* (2006.01)
*G06F 21/31* (2013.01)

(52) U.S. Cl.
CPC .............. *H04L 63/20* (2013.01); *G06F 21/316* (2013.01); *H04L 63/1408* (2013.01)

(58) Field of Classification Search
CPC . G06F 21/316; G06F 21/554; H04L 63/1408; H04L 67/306
USPC ............................................ 726/22; 713/168
See application file for complete search history.

(56) References Cited

U.S. PATENT DOCUMENTS

| | | | |
|---|---|---|---|
| 6,189,005 B1* | 2/2001 | Chakrabarti | G06F 17/30551 |
| 7,068,998 B2* | 6/2006 | Zavidniak | H04L 63/1416 |
| | | | 455/410 |
| 7,673,340 B1* | 3/2010 | Cohen | G06F 11/3438 |
| | | | 379/266.08 |
| 8,082,349 B1* | 12/2011 | Bhargava | G06Q 30/0185 |
| | | | 709/203 |
| 8,495,726 B2 | 7/2013 | Agarwal et al. | |
| 8,516,576 B2 | 8/2013 | Figlin et al. | |
| 8,719,452 B1* | 5/2014 | Ding | H04N 21/4344 |
| | | | 709/248 |
| 8,856,869 B1 | 10/2014 | Brinskelle | |
| 2002/0083067 A1* | 6/2002 | Tamayo | G06F 17/30864 |
| 2003/0188189 A1 | 10/2003 | Desai et al. | |
| 2004/0064731 A1* | 4/2004 | Nguyen | H04L 12/2602 |
| | | | 726/22 |
| 2004/0260733 A1* | 12/2004 | Adelstein | H04L 63/123 |
| 2005/0102292 A1* | 5/2005 | Tamayo | G06F 17/30539 |

(Continued)

OTHER PUBLICATIONS

U.S. Appl. No. 13/731,654, filed Dec. 31, 2012, titled: Time Sanitization of Network Logs from a Geographically Distributed Computer System.

(Continued)

*Primary Examiner* — Dao Ho
(74) *Attorney, Agent, or Firm* — Ryan, Mason & Lewis, LLP

(57) ABSTRACT

Methods, apparatus and articles of manufacture for modeling user working time using authentication events within an enterprise network are provided herein. A method includes collecting multiple instances of activity within an enterprise network over a specified period of time, wherein said multiple instances of activity are attributed to a given device; creating a model based on said collected instances of activity, wherein said model comprises a temporal pattern of activity within the enterprise network associated with the given device; and generating an alert upon detecting an instance of activity within the enterprise network associated with the given device that is (i) inconsistent with the temporal pattern of the model and (ii) in violation of one or more security parameters.

20 Claims, 4 Drawing Sheets

(56) References Cited

U.S. PATENT DOCUMENTS

| | | | |
|---|---|---|---|
| 2007/0028291 | A1 | 2/2007 | Brennan et al. |
| 2007/0073519 | A1* | 3/2007 | Long ............... G06F 21/552 702/185 |
| 2007/0180225 | A1 | 8/2007 | Schmidt |
| 2007/0192859 | A1* | 8/2007 | Shahar ............. G06F 21/552 726/22 |
| 2007/0261112 | A1 | 11/2007 | Todd et al. |
| 2008/0155651 | A1 | 6/2008 | Wasmund |
| 2009/0222907 | A1 | 9/2009 | Guichard |
| 2010/0020700 | A1 | 1/2010 | Kailash et al. |
| 2010/0095374 | A1 | 4/2010 | Gillum et al. |
| 2010/0274691 | A1* | 10/2010 | Hammad ........ G06Q 20/3221 705/30 |
| 2010/0332540 | A1* | 12/2010 | Moerchen ........ G06F 11/008 707/776 |
| 2011/0093944 | A1 | 4/2011 | Spielman |
| 2011/0185401 | A1 | 7/2011 | Bak et al. |
| 2012/0072983 | A1 | 3/2012 | McCusker et al. |
| 2012/0084282 | A1* | 4/2012 | Chiang ........... G06F 17/30864 707/725 |
| 2012/0109821 | A1 | 5/2012 | Barbour et al. |
| 2012/0246720 | A1 | 9/2012 | Xie et al. |
| 2012/0304288 | A1 | 11/2012 | Wright et al. |
| 2013/0124548 | A1 | 5/2013 | Chhaparia et al. |
| 2013/0124717 | A1 | 5/2013 | Stevens et al. |
| 2013/0247148 | A1 | 9/2013 | Nappier et al. |
| 2014/0245443 | A1 | 8/2014 | Chakraborty |

OTHER PUBLICATIONS

U.S. Appl. No. 13/731,643, filed Dec. 31, 2012, titled: Framework for Mapping Network Addresses to Hosts in an Enterprise Network.
U.S. Appl. No. 13/731,635, filed Dec. 31, 2012, titled: Anomaly Sensor Framework for Detecting Advanced Persistent Threat Attacks.
Abu et al., A Multifaceted Approach to Understanding the Botnet Phenomenon. In ACM SIGCOMM Conf. Internet Measurement, 2006, pp. 1-12.
Antonakakis et al., Building a Dynamic Reputation System for DNS. In USENIX Security, 2010, pp. 1-17.
Antonakakis et al., Detecting Malware Domains at the Upper DNS Hierarchy. In USENIX Security, 2011, pp. 1-16.
Antonakakis et al., From Throw-away Traffic to Bots: Detecting the Rise of DGA-based Malware. In USENIX Security, 2012, pp. 1-16.
Bilge et al., Disclosure: Detecting Botnet Command and Control Servers Through Large-scale NetFlow Analysis. In ACSAC, 2012, pp. 1-10.
Bilge et al., Exposure: Finding Malicious Domains Using Passive DNS Analysis. In NDSS, 2011, pp. 1-17.
Binkley et al., An Algorithm for Anomaly-based Botnet Detection. In USENIX Wksp. Steps to Reducing Unwanted Traffic on the Internet, 2006, pp. 43-48.
Brauckhoff et al., Anomaly Extraction in Backbone Networks Using Association Rules. In ACM SIGCOMM Conf. Internet Measurement, 2009, pp. 1-7.
Chapple et al., Authentication Anomaly Detection: A Case Study on a Virtual Private Network. In ACM Wksp. Mining Network Data, 2007, pp. 1-6.
Choi et al., Botnet Detection by Monitoring Group Activities in DNS Traffic. In IEEE Intl. Conf. Computer and Information Technology, 2007, pp. 715-720.
Cooke et al., The Zombie Roundup: Understanding, Detecting, and Disrupting Botnets. In USENIX Wksp. Steps to Reducing Unwanted Traffic on the Internet, 2005, pp. 1-6.
Dewaele et al., Extracting Hidden Anomalies Using Sketch and non Gaussian Multi-resolution Statistical Detection Procedures. In ACM Wksp. Large Scale Attack Defense, 2007, pp. 1-8.
Francois et al., BotTrack: Tracking Botnets Using NetFlow and PageRank. In Intl. IFIP TC 6 Conf. Networking. Springer-Verlag, 2011, pp. 1-14.
Freiling et al., Botnet Tracking: Exploring a Root-cause Methodology to Prevent Distributed Denial-of-service Attacks. In European Conf. Research in Computer Security. Springer-Verlag, 2005, pp. 1-32.
Gu et al., BotMiner: Clustering Analysis of Network Traffic for Protocol- and Structure-independent Botnet Detection. In USENIX Security, 2008, pp. 139-154.
Gu et al., BotHunter: Detecting Malware Infection Through IDS-driven Dialog Correlation. In USENIX Security, 2007, pp. 1-16.
Gu et al., BotSniffer: Detecting Botnet Command and Control Channels in Network Traffic. In NDSS, 2008, pp. 1-18.
Holz et al., Measuring and Detecting Fast-Flux Service Networks. In NDSS, 2008, pp. 1-12.
John et al., Studying Spamming Botnets Using Botlab. In USENIX NSDI, 2009, pp. 1-15.
Jolliffe. Principal Component Analysis. Springer-Verlag, 1986, pp. 1-56.
Karasaridis et al., Wide-scale Botnet Detection and Characterization. In USENIX Wksp. Hot Topics in Understanding Botnets, 2007, pp. 1-8.
Levine et al., The Use of Honeynets to Detect Exploited Systems Across Large Enterprise Networks. In IEEE Wksp. Information Assurance, 2003, pp. 92-99.
Livadas et al., Using Machine Learning Techniques to Identify Botnet Traffic. In IEEE Conf. Local Computer Networks, 2006, pp. 1-6.
Ma et al., Beyond Blacklists: Learning to Detect Malicious Web Sites from Suspicious URLs. In ACM SIGKDD Intl. Conf. Knowledge Discovery and Data Mining, 2009, pp. 1-9.
Nazario et al., As the Net Churns: Fast-flux Botnet Observations. In Intl. Conf. on Malicious and Unwanted Software, 2008, pp. 1-9.
Passerini et al., FluXOR: Detecting and Monitoring Fast-Flux Service Networks. In Intl. Conf. Detection of Intrusions and Malware, and Vulnerability Assessment. Springer-Verlag, 2008, pp. 1-20.
Perdisci et al., Detecting Malicious Flux Service Networks through Passive Analysis of Recursive DNS Traces. In ACSAC, 2009, pp. 1-10.
Ramachandran et al., Understanding the Network-level Behavior of Spammers. In ACM Conf. on Applications, Technologies, Architectures, and Protocols for Computer Communications, 2006, pp. 1-12.
Sperotto et al., Anomaly Characterization in Flow-Based Traffic Time Series. In IEEE Intl. Wksp. IP Operations and Management. Springer-Verlag, 2008, pp. 1-13.
Stone-Gross et al., Your Botnet is My Botnet: Analysis of a Botnet Takeover. In ACM CCS, 2009, pp. 1-13.
Strayer et al., Detecting Botnets with Tight Command and Control. In IEEE Conf. Local Computer Networks, 2006, pp. 1-8.
Villamarin-Salomon et al., Bayesian Bot Detection Based on DNS Traffic Similarity. In ACM Symp. Applied Computing, 2009, pp. 2035-2041.
Wagner et al., Entropy Based Worm and Anomaly Detection in Fast IP Networks. In IEEE Intl. Wksp. Enabling Technologies: Infrastructure for Collaborative Enterprise, 2005, pp. 1-6.
Yadav et al., Detecting Algorithmically Generated Malicious Domain Names. In ACM SIGCOMM Conf. Internet Measurement, 2010, pp. 1-14.
Yadav et al., Winning With DNS Failures: Strategies for Faster Botnet Detection. In Intl. ICST Conf. Security and Privacy in Communication Networks, 2011, pp. 1-10.
Yen et al., Traffic Aggregation for Malware Detection. In Intl. Conf. Detection of Intrusions and Malware, and Vulnerability Assessment. Springer-Verlag, 2008, pp. 207-227.
Zhang et al., Safeguarding Academic Accounts and Resources with the University Credential Abuse Auditing System. In Intl. Conf. Dependable Systems and Networks. IEEE Computer Society, 2012, pp. 1-8.
Page et al., "The PageRank citation ranking: Bringing order to the web." 1998, pp. 1-17.
Rosvall et al., "Maps of random walks on complex networks reveal community structure," PNAS, vol. 105, No. 4, pp. 1118-1123, Jan. 29, 2008, pp. 1-62.
U.S. Appl. No. 14/139,003, filed Dec. 23, 2013, titled: Detecting Suspicious Web Traffic from an Enterprise Network.

(56) References Cited

OTHER PUBLICATIONS

U.S. Appl. No. 14/139,047, filed Dec. 23, 2013, titled: Behavioral Detection of Suspicious Host Activities in an Enterprise.

U.S. Appl. No. 14/138,961, filed Dec. 23, 2013, titled: Identifying Suspicious User Logins in Enterprise Networks.

U.S. Appl. No. 14/698,201, filed Apr. 28, 2015, titled: Defending Against a Cyber Attack via Asset Overlay Mapping.

* cited by examiner

MODELING USER WORKING TIME USING AUTHENTICATION EVENTS WITHIN AN ENTERPRISE NETWORK

CROSS-REFERENCE TO RELATED APPLICATION

The present application claims priority to U.S. Provisional Patent Application Ser. No. 61/903,015, filed Nov. 12, 2013, entitled "Modeling Users' Regular Working Time Using Authentication Events in the Enterprise," incorporated by reference herein in its entirety.

FIELD

The field relates generally to information technology (IT), and more particularly to IT security within enterprises.

BACKGROUND

In many enterprises, after-hour user and/or employee activity commonly poses challenges. As used herein, "after-hour" activity refers to activities carried out by a user and/or employee of the enterprise prior or subsequent to the user's normal or regular hours associated with an enterprise role. Such activity might be observed when, for instance, a user's account is compromised by an attacker through various means (social engineering, breach of an authentication server, compromise of another external account, etc.) or the user's machine is infected with malware. Once a user's credentials or machines are compromised, the attacker has a multitude of attack vectors at his or her disposal, including using the compromised credentials to access other resources within the enterprise, installing a back-door from a compromised machine to an external command-and-control center, etc. These avenues of attacks can additionally induce user activity (for example, network traffic or authentication requests) at times of the day that differ from that of the associated user's regular working hours.

Further, in a (globally) distributed enterprise, users are located in different locations and likely have different job functions that induce different patterns of work activity (for example, IT administrators might work night shifts, while consultants may travel to many destinations and have irregular working hours). Consequently, existing user modeling approaches that include inferring a user's working hours based on the user's location (for example, assume working hours are 8 am-5 pm in the local time zone) routinely produce inaccurate results. Additionally, existing modeling approaches that include installation of agents on all end-point devices in the enterprise so as to upload users' login and log-off timestamps to a centralized location are expensive to deploy and commonly require changes to practices employed by most organizations.

Accordingly, a need exists for techniques to build a model of user activity within an enterprise setting and detect suspicious after-hour activity based on such a model.

SUMMARY

One or more illustrative embodiments of the present invention provide modeling user working time using authentication events within an enterprise network. In accordance with an aspect of the invention, a method is provided comprising the steps of: collecting multiple instances of activity within an enterprise network over a specified period of time, wherein said multiple instances of activity are attributed to a given device; creating a model based on said collected instances of activity, wherein said model comprises a temporal pattern of activity within the enterprise network associated with the given device; and generating an alert upon detecting an instance of activity within the enterprise network associated with the given device that is (i) inconsistent with the temporal pattern of the model and (ii) in violation of one or more security parameters.

In accordance with another aspect of the invention, a method is provided comprising the steps of: determining multiple instances of user activity within an enterprise network over a specified temporal training period, wherein said multiple instances of activity are attributed to a given device associated with the user; and creating a model based on (i) said collected instances of activity and (ii) one or more items of enterprise-related information pertaining to the user, wherein said model comprises a temporal pattern of activity within the enterprise network associated with the given device. The method also comprises the steps of: generating an alert upon detecting each of multiple instances of activity within the enterprise network associated with the given device that is (i) inconsistent with the temporal pattern of the model and (ii) in violation of one or more security parameters; assigning a risk score to each of the multiple alerts based on one or more risk factors; ranking the multiple alerts based on the assigned risk scores; and outputting the multiple alerts sequentially in an order matching said ranking.

The techniques of the illustrative embodiments described herein overcome one or more of the problems associated with the conventional techniques described previously, and provide temporal modeling techniques. These and other features and advantages of the present invention will become more readily apparent from the accompanying drawings and the following detailed description.

DETAILED DESCRIPTION

As will be described herein, the present invention, in one or more illustrative embodiments, provides techniques for modeling user working time using authentication events within an enterprise network. At least one embodiment of the invention includes capturing users' diurnal patterns of work activity with a fine-grained probabilistic model that is built over a period of observation (for example, one or more weeks or months).

Such a model, once built, can be used for detecting activity that occurs after-hours (that is, as described above, at a time when the user is not typically active and/or working), and determining whether such after-hour activity is indicative of an attack or other form of activity that is potentially harmful to the enterprise.

At least one embodiment of the invention includes leveraging security logs generated by domain controllers. By way of example, Windows® security logs record authentication requests from users on the Windows® domain. As authentication events are generated on a regular basis during the time a given user is logged onto a machine within the enterprise, at least one embodiment of the invention includes using such data to infer the time(s) when the given user is present and/or active at the machine.

Illustrative embodiments of the present invention will be described herein with reference to exemplary communication systems and associated processing devices. It is to be appreciated, however, that the invention is not restricted to use with the particular illustrative system and device configurations shown. Accordingly, a communication system or computing device, as used herein, is intended to be broadly construed so as to encompass any type of system in which multiple processing devices can communicate with one or more other devices.

Figure 1:
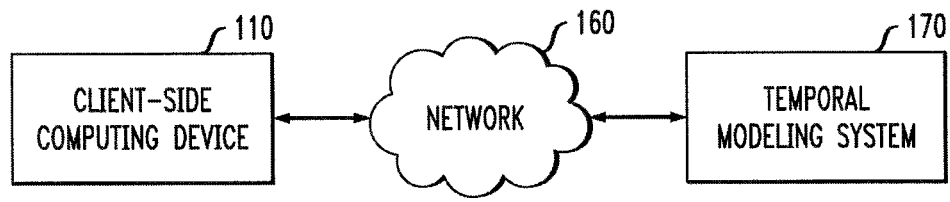
FIG. 1 is a diagram illustrating an example network environment in which one or more embodiments of the present invention can operate.

FIG. 1 illustrates an example client-side computing device (CSCD) 110 communicating with temporal modeling system 170 over a network 160. The network 160 can include, for example, a global computer network such as the Internet, a wide area network (WAN), a local area network (LAN), a satellite network, a telephone or cable network, or various portions or combinations of these and other types of networks.

In at least one embodiment of the invention, the CSCD 110 is a customer server which updates the temporal modeling system 170 with data. Accordingly, the CSCD 110 may represent a portable device, such as a mobile telephone, personal digital assistant (PDA), wireless email device, game console, etc. The CSCD 110 may alternatively represent a desktop or laptop personal computer (PC), a microcomputer, a workstation, a mainframe computer, or any other information processing device which can benefit from the use of fraud detection techniques in accordance with the invention. It is to be appreciated that a given embodiment of the disclosed system may include multiple instances of CSCD 110 and possibly other system components, although only a single instance is shown in the simplified system diagram of FIG. 1 for clarity of illustration.

The CSCD 110 may also be referred to herein as simply a "user." The term "user," as used in this context, should be understood to encompass, by way of example and without limitation, a user device, a person (or employee, for example) utilizing or otherwise associated with the device, or a combination of both. An operation described herein as being performed by a user may therefore, for example, be performed by a user device, a person utilizing or otherwise associated with the device, or by a combination of both the person and the device. Similarly, information described as being associated with a user may, for example, be associated with a CSCD device 110, a person utilizing or otherwise associated with the device, or a combination of both the person and the device.

An exemplary temporal modeling system (such as system 170 in FIG. 1) is described in additional detail below in connection with FIG. 2.

Figure 2:
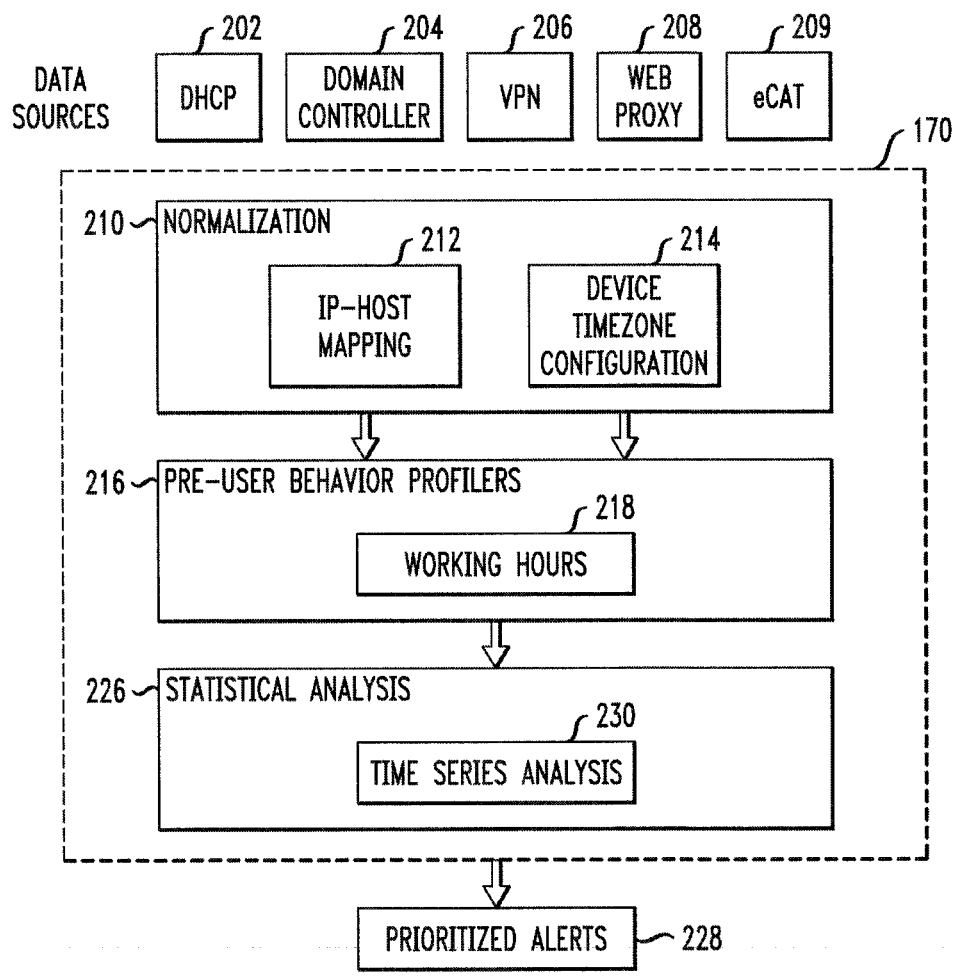
FIG. 2 is a block diagram illustrating example system components, according to an embodiment of the invention.

FIG. 2 is a block diagram illustrating example system components, according to an embodiment of the invention. FIG. 2 is a block diagram illustrating example system components, according to an embodiment of the invention. As depicted in FIG. 2, the temporal modeling system 170 acts on data received from various sources. Such data sources can include, for example, dynamic host configuration protocol (DHCP) servers 202, domain controllers 204, virtual private networks (VPNs) 206, web proxies 208 and enterprise malware threat detection software (such as, for example, eCAT) 209. Such data sources, as detailed herein, are processed and analyzed by the temporal modeling system 170 to ultimately generate prioritized alerts 228.

As also depicted in FIG. 2, the temporal modeling system 170 includes three layers: (1) a normalization layer 210 that includes functionality to parse, filter, and normalize log data using network-specific configuration information; (2) a per-user behavior profiler layer 216 that processes normalized log data to produce user behavior data associated with user temporal patterns; and (3) a statistical analysis layer 226 that performs one or more analytical techniques on the user behavior data to identify outlying and/or suspicious activity, which the temporal modeling system 170 reports as incidents and/or prioritized alerts 228.

As noted, the temporal modeling system 170 includes a normalization layer 210, wherein the timestamps of all log entries are normalized (for example, normalized to Coordinated Universal Time (UTC)) via device time zone configuration component 214. Additionally, the normalization layer 210 determines statically and dynamically assigned internet protocol (IP) addresses of hosts, and constructs bindings between hosts and IP addresses via IP-host mapping component 212, thus attributing every logged event to a specific host.

Referring back to the normalization layer 210, the device time zone configuration component 214 leverages the common use by enterprises of a central security information and event management (SIEM) system for log management that tags each log entry with its own timestamp $t_{siem}$, recording the time at which the log was received by the SIEM. For each device that sends logs to the STEM system, at least one embodiment of the invention includes computing a set of time difference values $\Delta_i = t_{siem,i} - t_{device,i}$ (that can be, for example, rounded off to the nearest 30 minutes) from each log entry i generated over a time period (for example, one month). Additionally, such an embodiment includes determining the timestamp correction value $\Delta_{correction}$ for the device by setting the correction value to the value $\Delta_i$ that accounts for the majority of differences. Applying this correction value to each device timestamp produces a normalized timestamp value, $t_{normalized,i} = t_{device,i} + \Delta_{correction}$. By way merely of example, $t_{normalized,i}$ can be configured to correspond to UTC. Additional description of an exemplary normalization technique can be found, for example, in U.S. patent application Ser. No. 13/731,654, entitled "Time Sanitization of Network Logs from a Geographically Distributed Computer System," filed on Dec. 31, 2012, and incorporated by reference herein in its entirety. Accordingly, at least one embodiment of the invention includes applying the above normalization technique to each device on the network that produces log data, normalizing all log timestamps (for example, to UTC).

Additionally, as depicted in FIG. 2, the temporal modeling system 170 includes an IP-host mapping component 212 as a part of the normalization layer 210. By way of example, the IP-host mapping component 212 analyzes DHCP server logs collected in the STEM system and constructs a database of IP-to-host mappings (also referred to herein as bindings) over time. Each binding is represented as a tuple {IP address, hostname, media access control (MAC) address, start-time, end-time} mapping an IF address to a host in a specific time interval. The algorithm implemented to carry out the mapping can be run at intervals (for example, daily) to update existing bindings as new DHCP logs become available. Given the resulting database of bindings, at least one embodiment of the invention can identify the host corresponding to a given IP address with reference to a normalized timestamp. Additional description of an exemplary mapping technique can be found, for example, in U.S. patent application Ser. No. 13/731,643, entitled "Framework for Mapping Network Addresses to Hosts in an Enterprise Network," filed on Dec. 31, 2012, and incorporated by reference herein in its entirety.

Accordingly, a temporal analysis component (identified as working hours component 218 in FIG. 2) resident on the per-user behavior profiler layer 216 of system 170 includes using authentication logs generated by domain controllers 204 to infer users' presence on given machines (as per the illustrative example detailed below, Windows® machines). It should also be appreciated by one skilled in the art that other data sources, such as network traffic generated by web proxies or domain name system (DNS) queries performed by the host and collected by internal DNS resolvers, can be used for inferring user activity. Additionally, at least one embodiment of the invention includes employing one or more filtering techniques to estimate the beginning and end of Windows "sessions;" that is, between corresponding login and log-off events. Using such data, at least one embodiment of the invention can also include building a probabilistic model of user behavior that represents the probability distribution of user activity at his or her machine(s) over a period of time (for example, throughout the work day). The model can subsequently be used detect potentially suspicious activity occurring after-hours (that is, during a time that is outside of the estimated temporal work patterns of the given user). The above-noted functions carried out by the working hours component 218 are discussed in additional detail below.

Referring back to FIG. 2, however, as depicted via statistical analysis layer 226 of temporal modeling system 170, at least one embodiment of the invention includes implementing one or more analytical operations such as applying a time series analysis 230 on user data.

As also detailed herein and depicted in FIG. 2, at least one embodiment of the invention includes generating incidents (also identified as prioritized alerts 228 in FIG. 2) pertaining to determined after-hours activity, and reporting the incidents to a security analyst. The incidents (or alerts) can include contextual information pertaining to activities occurring after-hours (for example, web sites accessed, machines logged into by a user, etc.).

As noted above, an aspect of the invention includes a temporal analysis component (such as working hours component 218 in FIG. 2) that facilitates and/or carries out a number of functionalities such as inferring a user's presence on a given machine, user profiling and model building, as well as detecting suspicious activity and model updating.

Inferring a user's presence on a given machine can include inferring specific intervals of user activity, such as described below. For each user, a list of his or her dedicated hosts is identified along with IP addresses corresponding thereto. As used herein, a "dedicated" host for a user refers to a host that is accessed solely by that user with a specified frequency (for example, the user is responsible for over 95% of the authentication events on that host).

Additionally, at a specified interval (for example, each day), at least one embodiment of the invention includes collecting authentication events generated by the user's dedicated machine(s). For example, one illustrative embodiment of the invention might only consider events with Windows® message IDs 4624, 4776, 4648, 528, 540, or 552, as these authentication events correspond to password logins or Kerberos authentication requests, which are relevant to the user's presence on the machine. At least one embodiment of the invention can further include filtering out events generated by system processes on behalf of the user, which may present special characters (such as '$' or '@') in the username. Such events correspond to automated activities that do not necessarily indicate that the user is present at the machine.

Also, with respect to the function of inferring specific intervals of user activity, at least one embodiment of the invention includes dividing each specified interval (for example, 24-hour period) into multiple bins or sub-intervals (for example, bins that are 30 minutes long, starting from midnight). For each sub-interval, the user can be considered to be active (that is, present and/or working on the machine) if there is, for example, at least one authentication event during that time interval.

Profiling and model building can include executing the above-noted steps pertaining to inferring a user's presence on a given machine (for example, every dedicated machine) for a specified training period. Such a training period might include, for example, executing the inference steps each day for every dedicated machine over a training period of one or more months. The collected information can then be used to profile user activity in the enterprise and build a model of typical behavior for the given user.

Accordingly, for each {user, dedicated host} pair, at least one embodiment of the invention includes storing, in a model, the following:

the number of active sessions, defined as the interval period wherein authentication activity was observed from that user on that host; and for each sub-interval, the fraction of sessions wherein the user is present on the host during that sub-interval (that is, wherein there is authentication activity from the user on the host during that sub-interval).

Additionally, at least one embodiment of the invention includes representing the distribution of a user's working hours on a machine by a vector such as, by way merely of example: $\{p_i\}_i = [1, 48]$, wherein $p_i$ is the probability (computed over sessions in the training period, for example) that the user is present on the machine during interval i. In the above-noted example vector, beginning at midnight, there are 48 30-minute sub-intervals in a 24-hour interval.

Additionally, during a detection of suspicious activity and model updating phase, which can occur regularly (for example, daily) after an initial model-building phase (such as detailed above), at least one embodiment of the invention includes identifying and/or marking activity generated during after-hours intervals as suspicious. Such a phase, in accordance with one or more embodiments of the invention, can be carried out using the following procedure.

For each user that has more than N active sessions in a model, an alert can be triggered for every time interval i in which the user is active, but in which the probability $p_i$ of the user being active as computed during the profiling phase is lower than a certain threshold T. The model can be updated by incrementing the number of active sessions and computing new probabilities $\{p_i'\}_i = [1, 48]$ for each user that is active during the given interval.

Also, at least one embodiment of the invention includes the use of parameters to control the amount of alerts being generated. By way of example, such parameters can include (i) the number of sessions N during which the user is monitored before generating an alert, and (ii) the threshold T below which an alert is generated. An example embodiment of the invention might include setting parameter N at 30 and parameter T at 0.01, but it is to be appreciated by one skilled in the art that parameter choice can be determined for each enterprise and/or implementation based on the number of users, machines, patterns of activity, and/or other context-dependent factors. Similarly, an example embodiment of the invention might include executing the detection and model updating phase daily, but such a phase can be run more or less frequently as determined by an enterprise's specific requirements and/or preferences.

Additionally, at least one embodiment of the invention includes implementing the techniques detailed herein in conjunction with one or more indicators of compromise. For instance, if the machine on which a given user is present after-hours also contacts one or more blacklisted sites (as identified via a separate indicator) or accesses some internal resources not typically accessed by the user (as also identified via a separate indicator), the after-hour behavior becomes more suspicious and can be identified as such.

Further, at least one embodiment of the invention can include prioritizing one or more generated alerts (such as depicted via component 228 in FIG. 2). For example, the length of the given after-hours session, the number of connections made during the given after-hours session, and/or the number of bytes sent and/or received after-hours can be used (with different weights, for instance) for computing a risk score for each alert. In such an embodiment, the alerts can be prioritized based on a ranking of computed risk score.

Figure 3:
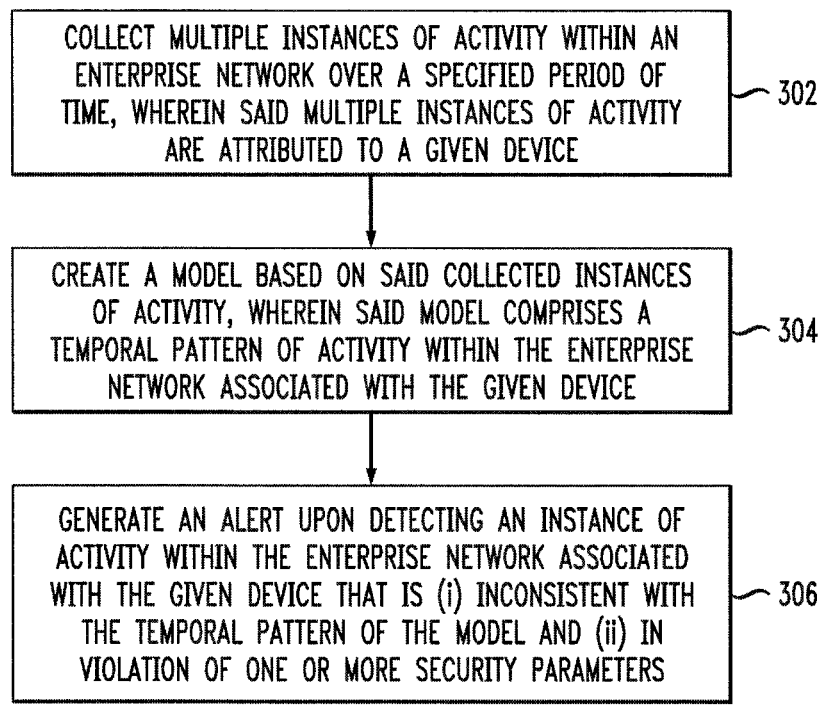
FIG. 3 is a flow diagram illustrating techniques according to an embodiment of the invention.

FIG. 3 is a flow diagram illustrating techniques according to an embodiment of the present invention. Step 302 includes collecting multiple instances of activity within an enterprise network over a specified period of time, wherein said multiple instances of activity are attributed to a given device. The collecting step can include collecting each authentication event involving the given device within the enterprise network over the specified period of time (for example, multiple days). Additionally, in at least one embodiment of the invention, the temporal pattern of activity can include an average daily start time and an average daily end time across said each collected instance of activity.

Step 304 includes creating a model based on said collected instances of activity, wherein said model comprises a temporal pattern of activity within the enterprise network associated with the given device. Step 306 includes generating an alert upon detecting an instance of activity within the enterprise network associated with the given device that is (i) inconsistent with the temporal pattern of the model and (ii) in violation of one or more security parameters. The security parameters can include, for example, one or more enterprise policies, contacting one or more blacklisted websites, and accessing one or more sensitive enterprise resources.

In at least one embodiment of the invention, creating the model can include representing a temporal distribution of activity associated with the given device via a vector expressing a probability that the given device is carrying out an instance of activity during a specified temporal interval. Additionally, generating an alert can include generating an alert for every temporal interval in which the given device is carrying out an instance of activity, but for which the probability that the given device is carrying out an instance of activity as expressed by the vector is lower than a certain threshold.

The techniques depicted in FIG. 3 can additionally include updating the model upon collection of additional instances of activity within the enterprise network attributed to the given device. Additionally, at least one embodiment of the invention also includes processing log data derived from one or more data sources associated with the enterprise network, wherein said log data pertain to activity within the enterprise network. Further, processing can include normalizing said log data, and said normalizing can include normalizing a timestamp associated with each item of said log data into a common time zone as well as establishing a mapping between each internet protocol (IP) address associated with said log data and a unique identifier for each given device.

Figure 4:
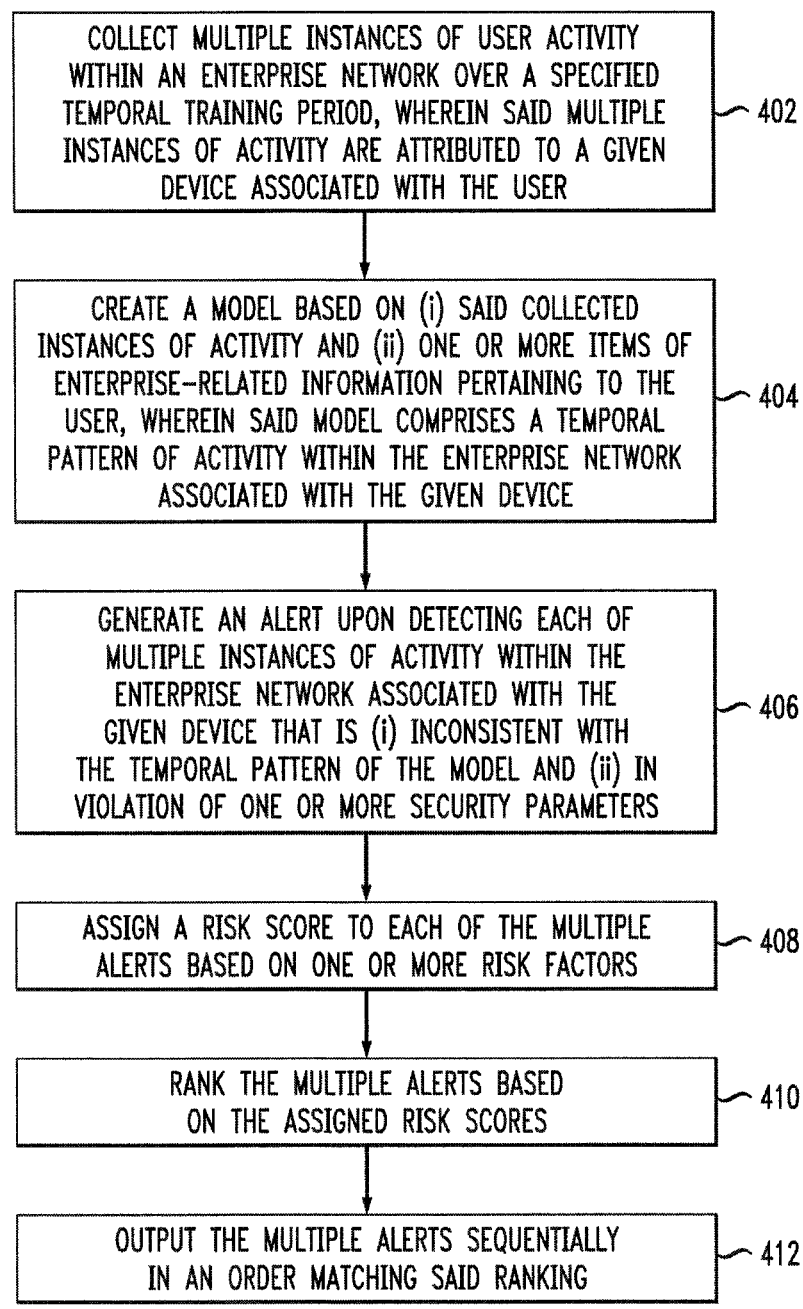
FIG. 4 is a flow diagram illustrating techniques according to an embodiment of the invention.

FIG. 4 is a flow diagram illustrating techniques according to an embodiment of the present invention. Step 402 includes collecting multiple instances of user activity within an enterprise network over a specified temporal training period, wherein said multiple instances of activity are attributed to a given device associated with the user. Step 404 includes creating a model based on (i) said collected instances of activity and (ii) one or more items of enterprise-related information pertaining to the user, wherein said model comprises a temporal pattern of activity within the enterprise network associated with the given device. Step 406 includes generating an alert upon detecting each of multiple instances of activity within the enterprise network associated with the given device that is (i) inconsistent with the temporal pattern of the model and (ii) in violation of one or more security parameters.

Step 408 includes assigning a risk score to each of the multiple alerts based on one or more risk factors. The risk factors can include, for example, the length of a detected instance of activity, the number of connections made during a detected instance of activity, and/or the amount of data sent and/or received during a detected instance of activity. Step 410 includes ranking the multiple alerts based on the assigned risk scores. Step 412 includes outputting the multiple alerts sequentially in an order matching said ranking.

Figure 5:
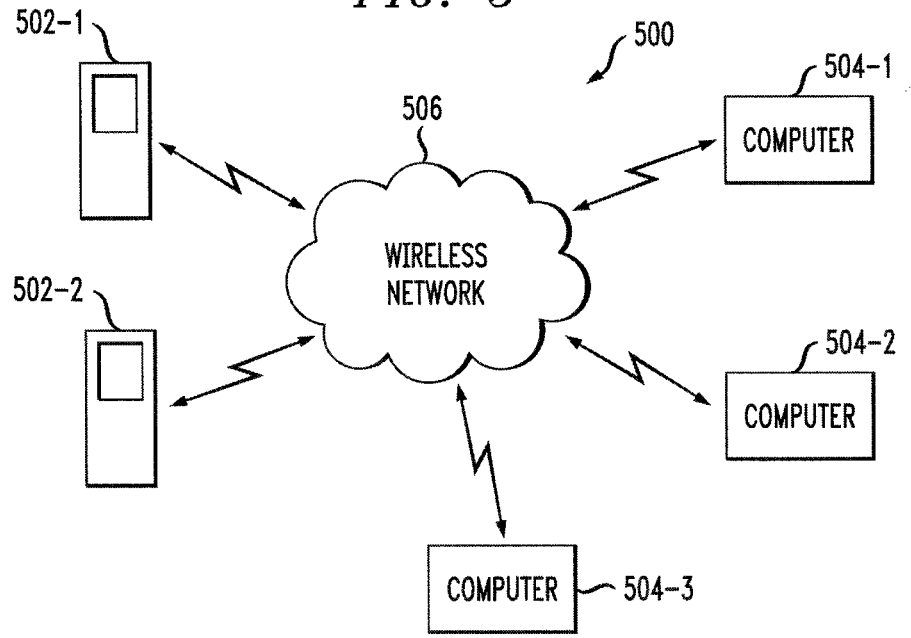
FIG. 5 shows an exemplary embodiment of a communication system that may incorporate the functionality of the type illustrated in at least one embodiment of the invention.

Temporal modeling techniques of the type described herein may be implemented in a wide variety of different applications. One exemplary communication system applications that may incorporate such techniques will now be described with reference to FIG. 5. Accordingly, FIG. 5 depicts a communication system 500 comprising a plurality of mobile telephones 502-1 and 502-2 and computers 504-1, 504-2 and 504-3, configured to communicate with one another over a network 506. For instances, such mobile telephones (for example, smart phones) and computers can be devices associated with employees and/or users within an enterprise network. It should be also be noted and appreciated that despite the limited number of devices illustrated in FIG. 5, the techniques described herein are scalable and, accordingly, can also be incorporated and/or implemented in connection with networks of much larger size.

Any two or more of the devices 502 and 504 may correspond to computing devices configured to implement at least one embodiment of the invention, as previously described. It is to be appreciated that the techniques disclosed herein can be implemented in numerous other applications.

Aspects of the present invention are described herein with reference to flowchart illustrations and/or block diagrams of methods, apparatus, systems and computer program products according to embodiments of the invention. It is to be appreciated that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As further described herein, such computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, as further detailed below, at least one embodiment of the invention includes an article of manufacture tangibly embodying computer readable instructions which, when implemented, cause a computer to carry out techniques described herein.

The computer program instructions may also be loaded onto a computer or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function (s). It should be noted that the functions noted in the block may occur out of the order noted in the figures.

Accordingly, the techniques described herein can include providing a system, wherein the system includes distinct software modules, each being embodied on a tangible computer-readable recordable storage medium (for example, all modules embodied on the same medium, or each module embodied on a different medium). The modules can run, for example, on a hardware processor, and the techniques detailed herein can be carried out using the distinct software modules of the system executing on a hardware processor.

Additionally, the techniques detailed herein can also be implemented via a computer program product that includes computer useable program code stored in a computer readable storage medium in a data processing system, wherein the computer useable program code was downloaded over a network from a remote data processing system. The computer program product can also include, for example, computer useable program code that is stored in a computer readable storage medium in a server data processing system, wherein the computer useable program code is downloaded over a network to a remote data processing system for use in a computer readable storage medium with the remote system.

As will be appreciated by one skilled in the art, aspects of the present invention may take the form of an entirely hardware embodiment, an entirely software embodiment (including firmware, resident software, micro-code, etc.) or an embodiment combining software and hardware aspects that may all generally be referred to herein as a "module" or "system."

An aspect of the invention or elements thereof can be implemented in the form of an apparatus including a memory and at least one processor that is coupled to the memory and operative to perform the techniques detailed herein. Also, as described herein, aspects of the present invention may take the form of a computer program product embodied in a computer readable medium having computer readable program code embodied thereon.

By way of example, an aspect of the present invention can make use of software running on a general purpose computer.

Figure 6:
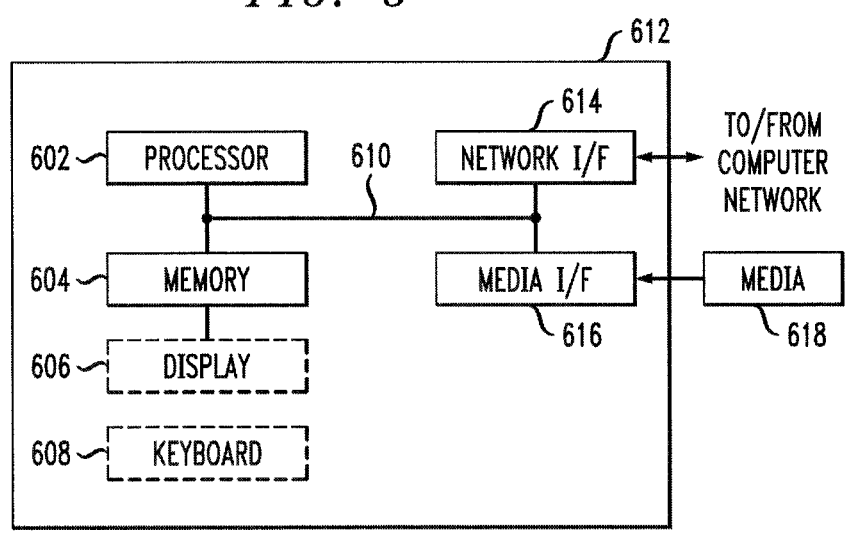
FIG. 6 is a system diagram of an exemplary computer system on which at least one embodiment of the invention can be implemented.

As noted above, FIG. 6 is a system diagram of an exemplary computer system on which at least one embodiment of the invention can be implemented. As depicted in FIG. 6, an example implementation employs, for example, a processor 602, a memory 604, and an input/output interface formed, for example, by a display 606 and a keyboard 608. The term "processor" as used herein includes any processing device(s), such as, for example, one that includes a central processing unit (CPU) and/or other forms of processing circuitry. The term "memory" includes memory associated with a processor or CPU, such as, for example, random access memory (RAM), read only memory (ROM), a fixed memory device (for example, a hard drive), a removable memory device (for example, a diskette), a flash memory, etc. Further, the phrase "input/output interface," as used herein, includes a mechanism for inputting data to the processing unit (for example, a mouse) and a mechanism for providing results associated with the processing unit (for example, a printer).

The processor 602, memory 604, and input/output interface such as display 606 and keyboard 608 can be interconnected, for example, via bus 610 as part of a data processing unit 612. Suitable interconnections via bus 610, can also be provided to a network interface 614 (such as a network card), which can be provided to interface with a computer network, and to a media interface 616 (such as a diskette or compact disc read-only memory (CD-ROM) drive), which can be provided to interface with media 618.

Accordingly, computer software including instructions or code for carrying out the techniques detailed herein can be stored in associated memory devices (for example, ROM, fixed or removable memory) and, when ready to be utilized, loaded in part or in whole (for example, into RAM) and implemented by a CPU. Such software can include firmware, resident software, microcode, etc.

As noted above, a data processing system suitable for storing and/or executing program code includes at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation. Also, input/output (I/O) devices such as keyboards 608, displays 606, and pointing devices, can be coupled to the system either directly (such as via bus 610) or through intervening I/O controllers.

Network adapters such as network interface 614 (for example, a modem, a cable modem or an Ethernet card) can also be coupled to the system to enable the data processing system to become coupled to other data processing systems or remote printers or storage devices through intervening private or public networks.

As used herein, a "server" includes a physical data processing system (such as system 612 as depicted in FIG. 6) running a server program. It will be understood that such a physical server may or may not include a display and keyboard.

As noted, at least one embodiment of the invention can take the form of a computer program product embodied in a computer readable medium having computer readable program code embodied thereon. As will be appreciated, any combination of computer readable media may be utilized. The computer readable medium can include a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Examples include an electrical connection having one or more wires, a portable computer diskette, a hard disk, RAM, ROM, an erasable programmable read-only memory (EPROM), flash memory, an optical fiber, a portable CD-ROM, an optical storage device, a magnetic storage device, and/or any suitable combination of the foregoing. More generally, a computer readable storage medium may be any tangible medium that can contain, or store a program for use by or in connection with an instruction execution system, apparatus, or device.

Additionally, a computer readable signal medium may include a propagated data signal with computer readable program code embodied therein, for example, in baseband or as part of a carrier wave. Such a propagated signal may take any of a variety of forms such as, for example, electro-magnetic, optical, or a suitable combination thereof. More generally, a computer readable signal medium may be any computer readable medium that is not a computer readable storage medium and that can communicate, propagate, or transport a program for use by or in connection with an instruction execution system, apparatus, or device.

Program code embodied on a computer readable medium can be transmitted using an appropriate medium such as, for example, wireless, wireline, optical fiber cable, radio frequency (RF), and/or a suitable combination of the foregoing. Computer program code for carrying out operations in accordance with one or more embodiments of the invention can be written in any combination of at least one programming language, including an object oriented programming language, and conventional procedural programming languages. The program code may execute entirely on a user's computer, partly on a user's computer, as a stand-alone software package, partly on a user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In light of the above descriptions, it should be understood that the components illustrated herein can be implemented in various forms of hardware, software, or combinations thereof, for example, application specific integrated circuit(s) (ASICS), functional circuitry, an appropriately programmed general purpose digital computer with associated memory, etc.

Terminology used herein is for the purpose of describing particular embodiments only and is not intended to be limiting of the invention. For example, the singular forms "a," "an" and "the" are intended to include the plural forms as well, unless clearly indicated otherwise. It will be further understood that the terms "comprises" and/or "comprising," as used herein, specify the presence of stated features, integers, steps, operations, elements, and/or components, but do not preclude the presence or addition of another feature, integer, step, operation, element, component, and/or group thereof. Additionally, the corresponding structures, materials, acts, and equivalents of all means or step plus function elements in the claims are intended to include any structure, material, or act for performing the function in combination with other claimed elements as specifically claimed.

Also, it should again be emphasized that the above-described embodiments of the invention are presented for purposes of illustration only. Many variations and other alternative embodiments may be used. For example, the techniques are applicable to a wide variety of other types of communication systems and computing devices that can benefit from temporal modeling techniques. Accordingly, the particular illustrative configurations of system and device elements detailed herein can be varied in other embodiments. These and numerous other alternative embodiments within the scope of the appended claims will be readily apparent to those skilled in the art.

What is claimed is:

1. A method comprising:
processing multiple items of log data derived from one or more data sources associated with an enterprise network, wherein said multiple items of log data pertain to multiple instances of activity within the enterprise network over a specified period of time attributed to a given device, and wherein said processing comprises normalizing said multiple items of log data by normalizing a timestamp associated with each respective one of the multiple items of log data to a common time zone via application of a correction function to the timestamp associated with each respective one of the multiple items of log data;
creating a model based on said multiple items of processed log data, wherein said model comprises a temporal pattern of activity within the enterprise network associated with the given device;
generating an alert upon detecting an instance of activity within the enterprise network associated with the given device that is (i) inconsistent with the temporal pattern of the model and (ii) in violation of one or more security parameters;
assigning a risk score to the alert based on one or more risk factors, wherein each respective one of the one or more risk factors has a discrete weight applied thereto;
prioritizing the alert over one or more additional alerts based on the risk score; and
outputting the alert and the one or more additional alerts sequentially in an order matching said prioritizing;
wherein said processing, said creating, said generating, said assigning, said prioritizing, and said outputting are carried out by at least one computing device.

2. The method of claim 1, wherein said processing comprises collecting each authentication event involving the given device within the enterprise network over the specified period of time.

3. The method of claim 1, wherein said specified period of time comprises multiple days.

4. The method of claim 1, wherein said creating the model comprises representing a temporal distribution of activity associated with the given device via a vector expressing a probability that the given device is carrying out an instance of activity during a specified temporal interval.

5. The method of claim 4, wherein said generating an alert comprises generating an alert for every temporal interval in which the given device is carrying out an instance of activity, but for which the probability that the given device is carrying out an instance of activity as expressed by the vector is lower than a certain threshold.

6. The method of claim 1, further comprising:
updating the model upon collection of additional instances of activity within the enterprise network attributed to the given device.

7. The method of claim 1, wherein said one or more security parameters comprises one or more enterprise policies.

8. The method of claim 1, wherein said one or more security parameters comprises contacting one or more blacklisted websites.

9. The method of claim 1, wherein said one or more security parameters comprises accessing one or more sensitive enterprise resources.

10. The method of claim 1, further comprising establishing a mapping between each internet protocol (IP) address associated with each respective one of the multiple items of log data and a unique identifier for the given device.

11. The method of claim 1, wherein the enterprise network comprises a geographically distributed enterprise network.

12. The method of claim 1, wherein said one or more risk factors comprise at least one of (i) the length of a detected instance of activity, (ii) the number of connections made during a detected instance of activity, and (iii) the amount of data sent and/or received during a detected instance of activity.

13. An article of manufacture comprising a non-transitory processor-readable storage medium having processor-readable instructions tangibly embodied thereon which, when implemented, cause a processor to carry out steps comprising:
- processing multiple items of log data derived from one or more data sources associated with an enterprise network, wherein said multiple items of log data pertain to multiple instances of activity within the enterprise network over a specified period of time attributed to a given device, and wherein said processing comprises normalizing said multiple items of log data by normalizing a timestamp associated with each respective one of the multiple items of log data to a common time zone via application of a correction function to the timestamp associated with each respective one of the multiple items of log data;
- creating a model based on said multiple items of processed log data, wherein said model comprises a temporal pattern of activity within the enterprise network associated with the given device;
- generating an alert upon detecting an instance of activity within the enterprise network associated with the given device that is (i) inconsistent with the temporal pattern of the model and (ii) in violation of one or more security parameters;
- assigning a risk score to the alert based on one or more risk factors, wherein each respective one of the one or more risk factors has a discrete weight applied thereto;
- prioritizing the alert over one or more additional alerts based on the risk score; and
- outputting the alert and the one or more additional alerts sequentially in an order matching said prioritizing.

14. An apparatus comprising:
a memory; and
at least one processor coupled to the memory and configured to:
- process multiple items of log data derived from one or more data sources associated with an enterprise network, wherein said multiple items of log data pertain to multiple instances of activity within the enterprise network over a specified period of time attributed to a given device, and wherein said processing comprises normalizing said multiple items of log data by normalizing a timestamp associated with each respective one of the multiple items of log data to a common time zone via application of a correction function to the timestamp associated with each respective one of the multiple items of log data;
- create a model based on said multiple items of processed log data, wherein said model comprises a temporal pattern of activity within the enterprise network associated with the given device;
- generate an alert upon detecting an instance of activity within the enterprise network associated with the given device that is (i) inconsistent with the temporal pattern of the model and (ii) in violation of one or more security parameters;
- assign a risk score to the alert based on one or more risk factors, wherein each respective one of the one or more risk factors has a discrete weight applied thereto;
- prioritize the alert over one or more additional alerts based on the risk score; and
- output the alert and the one or more additional alerts sequentially in an order matching said prioritizing.

15. A method comprising:
processing multiple items of log data derived from one or more data sources associated with an enterprise network, wherein said multiple items of log data pertain to multiple instances of activity within the enterprise network over a specified temporal training period attributed to a given device associated with the user, and wherein said processing comprises normalizing said multiple items of log data by normalizing a timestamp associated with each respective one of the multiple items of log data to a common time zone via application of a correction function to the timestamp associated with each respective one of the multiple items of log data;
creating a model based on (i) said multiple items of processed log data and (ii) one or more items of enterprise-related information pertaining to the user, wherein said model comprises a temporal pattern of activity within the enterprise network associated with the given device;
generating an alert upon detecting each of multiple instances of activity within the enterprise network associated with the given device that is (i) inconsistent with the temporal pattern of the model and (ii) in violation of one or more security parameters;
assigning a risk score to each of the multiple alerts based on one or more risk factors, wherein each respective one of the one or more risk factors has a discrete weight applied thereto;
prioritizing the multiple alerts based on the assigned risk scores; and
outputting the multiple alerts sequentially in an order matching said prioritizing.

16. The method of claim 15, further comprising:
updating the model upon collection of additional instances of activity within the enterprise network attributed to the given device.

17. The method of claim 15, wherein said one or more risk factors comprise the length of a detected instance of activity.

18. The method of claim 15, wherein said one or more risk factors comprise the number of connections made during a detected instance of activity.

19. The method of claim 15, wherein said one or more risk factors comprise the amount of data sent and/or received during a detected instance of activity.

20. The method of claim 15, wherein the enterprise network comprises a geographically distributed enterprise network.

* * * * *